(12) United States Patent
Port et al.

(10) Patent No.: US 6,720,061 B1
(45) Date of Patent: Apr. 13, 2004

(54) FILM COMPOSITES

(76) Inventors: Anthony B. Port, 124 Station Road, Earl Shilton, Leicestershire (GB), LE9 7GB; John P. A. Fairclough, 8 Bingham Park Road, Greystones, Sheffield (GB), S11 7BD; Anthony J. Ryan, 58 Nether Edge Road, Sheffield (GB), S7 1RX; Corrine L. O. Salou, 9 Salter Lane, Sheffield (GB), S11 8YL ( * ) Notice: Subject to any disclaimer, the term of this patent is extended or adjusted under 35 U.S.C. 154(b) by 0 days.

(21) Appl. No.: 09/936,939

(22) PCT Filed: Mar. 28, 2000

(86) PCT No.: PCT/GB00/01156

§ 371 (c)(1), (2), (4) Date: Nov. 13, 2001

(87) PCT Pub. No.: WO00/58760

PCT Pub. Date: Oct. 5, 2000

(30) Foreign Application Priority Data

Mar. 31, 1999 (GB) .............................................. 9907483

(51) Int. Cl.$^7$ .............................. B32B 3/00; B32B 7/02; B32B 27/06; B32B 27/36
(52) U.S. Cl. ........................ 428/156; 428/212; 428/220; 428/483; 252/582
(58) Field of Search .................................. 428/156, 212, 428/220, 483; 252/582; 385/141, 143, 129, 130

(56) References Cited

U.S. PATENT DOCUMENTS

| | | | |
|---|---|---|---|
| 4,014,728 A | 3/1977 | Erhardt | .................. 156/244 |
| 5,622,668 A | 4/1997 | Thomas et al. | .......... 264/289.3 |
| 5,654,046 A | * 8/1997 | Ninomiya et al. | ........... 428/1.3 |
| 5,656,205 A | 8/1997 | Rabolt et al. | ............... 252/582 |

FOREIGN PATENT DOCUMENTS

FR 2.138.465 5/1973

OTHER PUBLICATIONS

Patent Abstracts of Japan, vol. 017, No. 566, Oct. 14, 1993 & JP 05 164920, Jun. 29, 1993.

Patent Abstracts of Japan, vol. 004, No. 073, May 28, 1980 & JP 55 040705, Mar. 22, 1980.

Patent Abstracts of Japan, vol. 1999, No. 08, Jun. 30, 1999 & JP 11 080379, Mar. 26, 1999.

Patent Abstracts of Japan, vol. 010, No. 345, Nov. 20, 1986 & JP 61 146301, Jul. 4, 1986.

\* cited by examiner

*Primary Examiner*—Harold Pyon
*Assistant Examiner*—Catherine A. Simone
(74) *Attorney, Agent, or Firm*—Nixon & Vanderhye P.C.

(57) ABSTRACT

An optically active film composite comprising a transparent substrate and at least one layer of a block copolymer blend comprising between 30:70 to 70:30 percent by volume of each component of the copolymer, the block copolymer forming lamellar microdomains of each polymeric component, which components have different refractive indices. The thickness of the lamellae may be controlled through selection of molecular weights of the components and by the addition of compatible homopolymers.

15 Claims, 1 Drawing Sheet

FILM COMPOSITES

FIELD OF THE INVENTION

This invention relates to optically active film composites, and in particular but not exclusively to window film of the type adhered to the surfaces of already existing windows of buildings and vehicles.

BACKGROUND AND SUMMARY OF THE INVENTION

Certain block copolymer solutions are known to form distinctive morphologies and may spontaneously separate into microdomains when they are cooled from the melt or solvent is evaporated from solutions of the copolymers. The size, shape, spacing and number of the microdomains can be controlled through the selection of the relative amounts of the various comonomers, their molecular weight, and the thermodynamic incompatibility of the copolymer components. All this is disclosed in U.S. Pat. No. 5656205 and U.S. Pat. No. 5622668. In particular it is known that when the percentage volumes of the two components of the copolymers are substantially 50:50 the block copolymer will segregate into lamellar microdomains of the component polymers.

French Patent 2138 645 discloses a method for making high molecular weight block copolymers having lamellar layers of different refractive indices.

The present invention uses the known properties of block copolymers to produce film composites which are particularly useful for window film.

Accordingly there is provided an optically active layered composite comprising a substrate having thereon at least one layer of block copolymer film comprising at least two polymeric components separated into lamellar microdomains of each polymeric component, which components have different refractive indices.

Optical properties include reflectance properties and light transmission properties.

Typically the block copolymer comprises between 30:70 and 70:30 volume percent of each component of the copolymer, preferably between 40:60 to 60:40 volume percent of each component, and more preferably 50:50 by volume of each component.

Polystyrene:polybutadiene (PS-PB) block copolymers can produce lamellar structures with a styrene butadiene volume ratio of 30:70, and polybutadiene-polyethylene oxide block copolymers will produce lamellar structures with a 30:70 volume ratio of butadiene:ethylene oxide.

The block copolymer film is optically clear, that is essentially haze free, and the difference between the refractive indices of the two components should be at least 0.08. The block copolymer layer preferably reflects at least 50% of incident light of selected wavelengths.

The substrate may be covered in a plurality of layers of block copolymer film, and the repective block copolymer in one layer may be different than the respective copolymer in another layer so that different film layers selectively reflect different wavelegths of incident light.

The preferred substrate is a transparent substrate, preferably a polymeric film, typically polyethylene terephthalate (PET), and preferably the block copolymer layer is sandwiched between two film substrates. The substrate film may have a thickness of about 12–50 microns, as is typically used for window film.

The block copolymer typically contains as one component a high refractive index polymer such as polystyrene and the other component may comprise a lower refractive index polymer such as at least one of the following: polyisoprene, polybutadiene, polymethyl methacrylate, polydimethylsiloxane, polyethylene-butylene (hydrogenated polybutadiene).

The copolymer may be in form of diblock copolymers A-B where A & B are different polymer components, or triblock copolymers A-B-A.

The lamellar microdomains are formed with the two polymers forming alternating domains of components A & B formed from an AB or ABA block copolymer. The thickness of a pair of adjacent domains in lamellar morphology is referred to as the "d" spacing. The "d" spacing is determined by the molecular weight (MW) of the copolymer and will be the same (for a given MW) for AB or ABA copolymer.

The thickness of the lamellae is related to the molecular weight by the equation:

$$d = K\, Mn^{2/3}$$

where k is a constant for the particular pair of polymers in the block copolymer; and d is the lamellar thickness of two adjacent domains in nanometer; and Mn=number average molecular weight of the copolymer in g/mole.

For example, for a styrene:butadiene block copolymer $$d = 0.024\, Mn^{2/3}$$

(Hashimoto et al Macromolecules 1980, 13, 1237)

It is therefore possible to make film composites that reflect light of a particular band width by selection of the molecular weight of the copolymer.

For a PS-PB block copolymer the number average molecular weight (Mn) of the block copolymer is in the range of 200,000 to 2000,000, preferably 250,000–1000000, and more preferably 300,000–600,000.

The "d" spacing is not affected in theory by the thickness of the applied block copolymer layer. Thickness does affect the number of lamellar domain pairs. For example, a 1 micron coating of an AB block copolymer having a molecular weight such that it forms a lamellar morphology with a "d" spacing of 100 nm, will segregate into 10 lamellar domain pairs of A & B, and hence 20 alternating lamellae of A & B.

Reflection is best provided by lamellar domains having a thickness of about ¼ wavelength. The wave length of light varies with the refractive index of the material through which it is passing according to the formula:

$$\lambda\ \text{material} = \frac{\lambda\ \text{air}}{\eta\ \text{material}}$$

where $\lambda$=wavelength, $\eta$= refractive index.

The film composite may be made to reflect particular wave bands of light by selection of the copolymer component to provide "tailored" average thickness lamellae. For example for a block copolymer having a refractive index of between 1.5–1.6 (typical for polymers) a UV light ($\lambda$=350 nm) is reflected by lamellae having a thickness of about 60 nm. IR light ($\lambda$ 800–1500 nm) is reflected by lamellae having a thickness of between 140–250 nm, and visible light ($\lambda$ 400–800 nm) is reflected by lamellae having a thickness of between 70–140 nm. In practice, it is believed that the maximum thickness of lamellae that can produced will be about 170 nm.

The "d" spacing may also be increased by the inclusion of a diluent either in the form of a compatible solvent, plasticizer, or homopolymer. Typical solvents are cumene, or chloroform with PS-PB block copolymer, or toluene with the block copolymers of polystyrene/polyisoprene; polystyrene/polybutadiene; polystyrene/polymethyl methacrylate; polystyrene/polydimethylsiloxane. Typical plasticizers may include hydrocarbon oils for use with polybutadiene.

The volume fractions of each copolymer may be made up entirely of the respective copolymer component, or copolymer plus a compatible homopolymer diluent. The compatible homopolymer may comprise the homopolymer of a respective copolymer component. For example polystyrene or polybutadiene may be mixed with PS-PB block copolymer, to achieve a total volume ratio of polystyrene-:polybutadiene of about 1:1. Alternatively, or additionally the homopolymer may comprise a different homopolymer, for example poly 2,6 dimethylphenylene oxide may be added to swell the polystyrene phase of a block copolymer.

Homopolymer polystyrene may be added to a PS-PB copolymer consisting of a 30:70 ratio polystyrene:polybutadiene to raise the polystyrene ratio from 30:70 to 60:40 polystyrene:polybutadiene. The diluent homopolymer should have a lower molecular weight than the block copolymer to which it is added. Preferably the molecular weight of the homopolymer should not exceed 40% of the molecular weight of the block copolymer to which it is added.

When a block copolymer is blended with a homopolymer the properties of the lamellar domains are related to the molecular weights of the various components by a factor α, where:

$$\alpha = \frac{\sqrt{(NaNb)}}{Nab} < 0.5$$

where Na is the number average degree of polymerisation of homopolymer component a, Nb is the number average degree of polymerisation of homopolymer component b, Nab is the number average degree of polymerisation of the diblock copolymer.

The smaller is α then the flatter are the lamellar domains and the interfaces between adjacent lamellar domains. Preferably α<0.2, and for best light transmission and reflection properties α<0.1.

The volume fraction of homopolymer which can be added to the block copolymer to form a blend is also related to α such that the smaller is α then the more homopolymer can be added to the blend. The addition of homopolymer makes the blend less viscous and easier to process as well a producing a cheaper blend.

Preferably, the maximum volume fraction of homopolymer in the blend should not exceed 0.8.

The "d" spacing for the lamellar domains is also dependant upon the volume fraction of homopolymer φh in the blend such that there is correlation between the "d" spacing of the pure block copolymer Do and the "d" spacing of the blend Db, such that Db increases with increasing volume fraction of the homopolymer up to a maximum where Do:Db is between 1:4 and 1:5. For a PS-PB block copolymer, either or both homopolymers may be used dependant upon which lamellar domains require swelling to achieve particular optical properties.

The copolymer blend may include antioxidants, heat and light stabilizers, and UV absorbers as additives. Optically active additives may be added, for example dye, and/or particles of a high refractive index material which are preferably added to the higher refractive index component of the copolymer blend. High refractive index particles include antimony tin oxide, indium tin oxide, titanium dioxide, and iron oxide.

Also according to the present invention, there is provided a light reflective film composite comprising a transparent substrate coated by block copolymer comprising two polymeric components separated into lamellar microdomains, which components have different refractive indices, and at least one of the components including particles of material having a different refractive index from said one component. Preferably said one component is the higher refractive index component, and the particles are particles of a high refractive index material.

One method for making block copolymer film coatings is by spin casting the block copolymer in a solvent, typically toluene, the solutions being coated onto a substrate with the evaporation of the solvent and microphase separation taking place gradually from the exposed surface adjacent the air interface and inwardly as the solution evaporates.

The thickness of the coating may be controlled by a draw bar. Thin coatings less than 250 μm encourage the lamellae to form substantially parallel to the substrate.

Preferred methods of coating a block copolymer solution are by means of roller coating especially by the use of gravure coating and printing techniques and slot die coating.

Also, according to the invention, there is provided a method of making of an optically active composite film in which method a solution of block copolymer blend is coated onto a film substrate and is then caused to separate into lamellar microdomains of each polymeric components, which components have different refractive indices.

Preferably the optically active film can be made to reflect a desired percentage of light and/or a desired wave band of light by controlling the difference in refractive indices, the thickness of the lamellar microdomains, and/or their number.

The thickness of the microdomains may be controlled by the addition of diluents for example homopolymers having a lower molecular weight than the polymer fractions to which they are added.

Film composite according to the present invention may be applied to vehicle windows, the windows of building, in particular the windows of pre-existing buildings, PC monitor screens, video screens, and any other surface which may be required to be optically active for example packaging, show cases and display stands.

BRIEF DESCRIPTION OF THE DRAWINGS

The invention will described by way of example and with reference to the accompanying drawings in which.

DETAILED DESCRIPTION OF THE INVENTION

Figure 1:
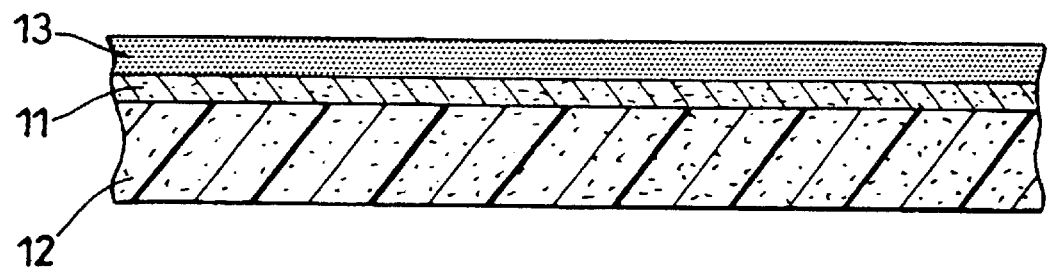
FIG. 1 is a first film composite according to the present invention.

Typical diblock copolymers are polystyrene-block-poly(ethylene-ran-butylene)-block-polystyrene (PS-PEB-PS) and polystyrene-block-polybutadiene (PS-PB), polystyrene-block-polyisoprene and polystyrene-block-poly(dimethylsiloxane) (PS-PDMS). Block copolymers are generally available from Polymer Sources Inc., Canada, Shell Chemicals.

For reflecting block copolymer film the reflectivity is dependent upon the difference between the refractive indices (ΔR) of the adjacent lamellae, and the percentage reflection will be a function of the number of layers of lamellae formed during the phase separation into microdomains. These values can be calculated and are shown in Table 1 below:

TABLE 1

| | ΔR | | | |
|---|---|---|---|---|
| Lamellae | 0.08 | 0.1 | 0.17 | 0.2 |
| 10 | 4% | 6% | 20% | 28% |
| 20 | 18% | 28% | 70% | 92% |
| 30 | 27% | — | 83% | — |
| 40 | 56% | 70% | 94% | 96% |

Table of percentage reflection vs number of lamellae for different refractive index differences.

ΔR 0.08 is typical for a PS-PB diblock copolymer.
ΔR 0.17 is typical for a PS-PDHS diblock copolymer.

Typically a reflectivity in excess of 80% is desired for removal of infrared or UV light and it is seen that a PB-PS diblock copolymer will require in order of 70–80 lamellae in order to be IR or UV reflective. On the other hand when only a partial reflectivity is required on for example decorative film for interior use, the PB-PS diblock copolymer can reflect the desired percentage of light. The wavelength of the reflected light will be dependent upon the thickness of the respective lamellae as is shown in Table 2.

TABLE 2

| | Wavelength | lamellar thickness | d spacing | total thickness 20 lamellae | total thickness 40 lamellae |
|---|---|---|---|---|---|
| UV | 350 nm | 60 nm | 120 nm | 1.2 μm | 2.4 μm |
| VIS | 400 nm | 70 nm | 140 nm | 1.4 μm | 2.8 μm |
| | 500 nm | 85 nm | 170 nm | 1.7 μm | 3.4 μm |
| | 600 nm | 100 nm | 200 nm | 2.0 μm | 4.0 μm |
| IR | 800 | 140 nm | 280 nm | 2.8 μm | 5.6 μm |
| | 1000 | 170 nm | 340 nm | 3.4 μm | 6.8 μm |

So for example if we have a PS-PDMS block copolymer having a ΔR=0.17 then in order to efficiently reflect UV light, a film of block copolymer should be at least 30 lamellae with a "d" spacing of about 120 nm. Similarly, reflecting visible light (taking a mid-range value of 500 nm) will again require PS-PDMS block copolymer having at least 30 lamellae with a d-spacing of 170 nm, and a PS-PB block copolymer coating will require about 60 lamellae having a "d" spacing of 170 nm. The "d" spacing can be tailored using molecular weight of the copolymer, and swelling the lamellae layers as previously described.

The invention will be illustrated by reference to the following examples using PS-PB diblock copolymer, and PS-PB diblock copolymer/homopolymer blends. The blockpolymers and homopolymers were sourced from Polymer Sources Inc., Canada and Shell Chemicals.

Table 3 gives details of the various samples prepared.

TABLE 3

Preparation of Samples

| sample | Wt % copolymer | Wt % PS | Wt % PB | Vol fractn PS $\phi_{ps}$ | Vol fractn homopolymer $\phi_h$ | Conc sol. Wt % |
|---|---|---|---|---|---|---|
| 1 | 40 | 30 | 30 | 0.4 | 0.56 | 22 |
| 2 | 100 | 00 | 00 | 0.46 | 00.00 | 10 |
| 3 | 69 | 20 | 11 | 0.50 | 0.26 | 10 |
| 4 | 26 | 42 | 34 | 0.48 | 0.73 | 10 |
| 5 | 13 | 51 | 36 | 0.52 | 0.84 | 10 |
| 6 | 8 | 53 | 39 | 0.51 | 0.90 | 10 |

All molecular weights (MW) are number average MW in g/mol. The diblock copolymer used in sample 1 was a PS-PB copolymer having a MW of about 83,000, and in all other samples MW of about 300,000. The homopolymer PS had a MW of about 9300 and the homopolymer PB had a MW of about 12000. The volume fraction $\phi_{ps}$ is the total fraction of PS in both the PS-PB block copolymer and homopolymer diluent, and the volume fraction homopolymer $\phi_h$ is the total of homopolymer diluent, both PS & PB, added to any blend.

Solutions of the samples were made up in toluene until the solutions were clear, if necessary using a bain-marie (waterbath) heated at 50° C. The solutions when clear, were coated onto a clean PET film (polyethylene terephthallate) and formed to an even thickness using a draw bar. For the Ultra Violet Spectrophotometry tests the wet coating thickness was set at 250 μm. The coated PET film was then left to dry overnight at ambient temperature to allow the solvent to evaporate. Drying was then completed in a vacuum oven at 50° C. for 24 hours.

Ultra Violet Analysis

The samples were tested using a CamSpec M350 UV spectrophotometer measuring the reflection of the composite against wavelength.

Sample 1 did not produce any useful data. Details of reflective peaks for the other samples are given in Table 4 below:

TABLE 4

| Sample | Reflective Peak in Wavelength nm |
|---|---|
| 2 | 214 |
| 3 | 235 |
| 4 | 280 |
| 5 | 280 |
| 6 | 278 |

Thus, it can see that as the molecular weight increased up to 300,000 the coating became optically active and a reflection peak at 214 nm corresponds with a "d" spacing of 107 nm This has been confirmed by the use of scanning electron microscope.

As the addition of homopolymer increases the "d" spacing increases, as is evidenced by the shift in the reflection peak upto 280 nm. Once the volume fraction of homopolymer exceeds about 0.8 there is no consequent shift in the reflection peak, although a second peak is seen to grow above 330 nm.

The block copolymer coating may be applied as a solution, or viscous copolymer/homopolymer blend, to film substrate using gravure printing and coating techniques. The printing rollers will help orient the copolymer molecules to favour phase separation into oriented lamellar microdomains.

Now with reference to FIG. 1 there is shown a window or decorative film composite laminate according to the present invention in which a diblock copolymer layer 11 is applied to a polyethyleneterephthalate (PET) sheet 12. A layer of adhesive 13 may be applied over the block copolymer 11 so that the film composite may be adhered to the surface of a window of a building or vehicle, or alternatively an interior surface to be decorated, with the PET substrate facing away from the surface. The copolymer layer 11 is devised in the manner as described above to reflect the desired band width of light. Optionally it may be necessary to treat the surface of the PET substrate 12 to ensure good adhesion with the block copolymer and an optional adhesive layer may be applied between the block copolymer layer 11 and PET substrate if required. Furthermore, an optional hard scratch resistant coating (see 25 in FIG. 2) may be applied between the PET substrate 12 and the block copolymer 11, or on the reverse side (exposed side) of the PET substrate.

Figure 2:
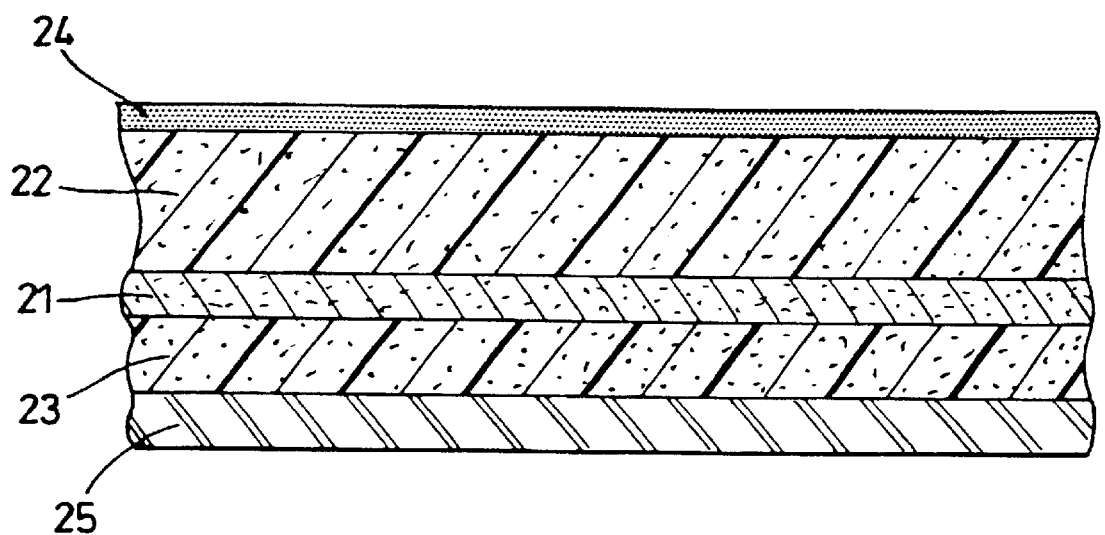
FIG. 2 is a second composite according to the present invention.

A second preferred embodiment of the invention is shown in FIG. 2 in which a block copolymer layer 21 is sandwiched between two sheets of PET substrates 22, 23 with an adhesive layer 24, applied to the external face of one PET substrate sheet 22, and an optional scratch-resistant coating 25 applied to the other external face of the composite on the other PET substrate sheet 23, and which on use will face outwardly from any window on which the film composite is adhered. An optional adhesive layer may be required between the block copolymer layer 21 and the PET sheets 22, 23, and an alternative or optional further scratch resistant coating may be inserted between the substrate and the block copolymer layer 21.

Since the percentage of light reflection is dependent upon the thickness of the copolymer coating, it is possible to achieve different optical effects by providing the block copolymer coating with areas of different thickness during the coating operation. The percentage of light reflected from these areas will be different.

As well as coating a PET film substrate, the diblock or triblock copolymer coating could be applied to glass or other transparent substrates as well as to the PET film described herein.

Other materials may be added to the copolymer blend to provide other optical effects. For example dyes, and/or particles of a high refractive index material may added to the blend. Examples of high refractive index materials include titanium dioxide, oxides of iron, silica, etc.

The high refractive index particles are preferably added to the higher refractive index component of the block copolymer blend.

The block copolymer layer may include other additives such as light and heat stabilizers, Uv absorbers, antioxidents etc. and may be laminated with other conventional layers such as metallised film or sputtered film layers.

What is claimed is:

1. An optically active layered composite comprising a substrate having thereon at least one layer of a block copolymer film comprising polymeric component "a" and polymeric component "b", said polymeric components "a" & "b" being separated into lamellar microdomains of each polymeric component, which components have different refractive indices, with said components of the block copolymer present as a blend of both copolymer and its respective homopolymer, wherein polymeric component "a", polymeric component "b", diluent homopolymer "a" and diluent homopolymer "b" are selected such that:

$$\frac{\sqrt{(NaNb)}}{Nab} < 0.5$$

where Na is the number average decree of polymerisation of homopolymer "a", Nb is the number average degree of polymerisation of homopolymer "b", Nab is the number average degree of polymerisation of the block copolymer.

2. A composite as claimed in claim 1 wherein the block copolymer film is formed from a blend of block copolymer and homopolymers in which the total volume fraction of homopolymers does not exceed 0.8.

3. A composite as claimed in claim 1, wherein the block copolymer comprises substantially 50:50 percent by volume of each component of the copolymer.

4. A composite as claimed in claim 1, wherein the molecular weight of the block copolymer is between 200,000 and 2000,000.

5. A composite as claimed in claim 4, wherein the molecular weight of any homopolymer present in the copolymer blend does not exceed 40% of the molecular weight of the copolymer.

6. A composite as claimed in claim 1, wherein the copolymer blend includes as additives at least one of a dye and particles of a high refractive index material.

7. A film composite as claimed in claim 1, wherein the differences between the refractive indices of the microdomains of the different copolymer components is between 0.07 and 0.2.

8. A film composite as claimed in claim 1, wherein the block copolymer is diblock of polystyrene: polybutadiene.

9. A composite as claimed in claim 1, wherein the substrate comprises transparent polymeric film.

10. A film composite as claimed in claim 1, wherein the polymeric film comprises transparent polyethylene terephthalate film.

11. A film composite as claimed in claim 1, wherein the composite comprises a plurality of layers of said block copolymer film.

12. A film composite as claimed in claim 1, wherein the composite comprises a second polymeric substrate arranged so that the diblock copolymer film is sandwiched between the two substrates.

13. A film composite as claimed in claim 1, wherein the block copolymer film has areas of different thickness providing different optical effects.

14. Apparatus including a film composite as claimed in claim 1.

15. An optically active layered composite comprising a transparent polymeric substrate having thereon at least one layer of a-block copolymer film of polystyrene: butadiene, the styrene and butadiene components of the copolymer being separated into lamellar microdomains of each polymeric component, said components having different refractive indices, and being present as a blend of .both copolymer and its respective homopolymer wherein polymeric component "a", polymeric component "b", diluent homopolymer "a" and diluent homopolymer "b" are selected such that:"

$$\frac{\sqrt{(NaNb)}}{Nab} < 0.2$$

where Na is the number average degree of polymerisation of homopolymer "a", Nb is the number average degree of polymerisation of homopolymer "b", Nab is the number average degree of polymerisation of the block copolymer.

* * * * *